USOO5953340A

United States Patent [19]
Scott et al.

[11] Patent Number: 5,953,340
[45] Date of Patent: *Sep. 14, 1999

[54] ADAPTIVE NETWORKING SYSTEM

[75] Inventors: Craig M. Scott, Irving; Arthur T. Bennett, Coppell, both of Tex.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/759,139

[22] Filed: Dec. 2, 1996

Related U.S. Application Data

[63] Continuation-in-part of application No. 08/501,288, Jul. 12, 1995, Pat. No. 5,742,602.
[51] Int. Cl.⁶ .............................. H04L 12/46; H04Q 1/00
[52] U.S. Cl. ......................................... 370/401; 370/465
[58] Field of Search .................................. 370/400, 401, 370/402, 403, 404, 405, 412, 465, 466, 467, 468, 469; 395/200.5, 200.51, 200.62, 200.63, 200.79, 200.8

[56] References Cited

U.S. PATENT DOCUMENTS

| | | | |
|---|---|---|---|
| 5,305,317 | 4/1994 | Szczepanek | 370/257 |
| 5,541,957 | 7/1996 | Lau | 375/258 |
| 5,568,525 | 10/1996 | de Nijs et al. | 375/356 |
| 5,574,722 | 11/1996 | Slykhouse et al. | 375/295 |
| 5,600,644 | 2/1997 | Chang et al. | 370/404 |
| 5,617,418 | 4/1997 | Shirani et al. | 370/465 |

*Primary Examiner*—Alpus H. Hsu
*Assistant Examiner*—Kwang B. Yao
*Attorney, Agent, or Firm*—Akin, Gump, Strauss, Hauer & Feld, L.L.P.

[57] ABSTRACT

An adaptive networking device including a switch module having several ports and operable according to a first protocol and a repeater module also having several ports and operable according to a second protocol. The adaptive networking device preferably includes several connector ports for coupling to external data devices, such as computers, work stations, file servers, modems, printers, repeaters, switches, routers, hubs, concentrators, or the like, for establishing a networking system. Also, the adaptive networking device preferably includes an interface circuit for each connector port for detecting communication from a data device on the corresponding connector port and for coupling that data device to either the switch module or the repeater module. The interface circuit preferably senses the protocol of the communication and automatically couples the data device to the corresponding and compatible communication module. In a second embodiment, the adaptive networking device includes a converter coupled between the switch module and the repeater module for converting the protocols between the switch and repeater modules. In a more particular embodiment, the first and second protocols operate at first and second data rates, respectively.

20 Claims, 10 Drawing Sheets

ADAPTIVE NETWORKING SYSTEM

CONTINUATION DATA

This is a continuation-in-part of co-pending U.S. Pat. application Ser. No. 08/501,288 entitled "Adaptive Repeater System" filed Jul. 12, 1995, now U.S. Pat. No. 5,742,602, whose inventor was Arthur T. Bennett, and which is hereby incorporated by reference in its entirety.

FIELD OF THE INVENTION

The present invention relates to the field of networking data devices, and more particularly to an adaptive networking device for enhancing performance of a hybrid networking system.

DESCRIPTION OF THE RELATED ART

Ethernet is a shared-media network architecture defined in the Institute of Electrical and Electronics Engineers (IEEE) 802.3 standard, and is currently the most widely used architecture for local-area networks (LANs). Ethernet uses both bus and star topologies having nodes attached to a trunk segment, which is the main piece of cable in an Ethernet network. The 10Base-T is a communication protocol based on the IEEE 802.3 standard, which is a baseband 802.3-based Ethernet network that operates up to 10 Mbps (megabits per second), and uses unshielded twisted-pair (UTP) cable configured in a star topology. The 10Base-T protocol is also known as twisted-pair Ethernet or UTP Ethernet.

Another Ethernet standard has emerged, referred to as fast Ethernet or 100Base-T Ethernet, which includes implementations capable of 100 Mbps transmissions speeds over UTP or shielded twisted-pair (STP) and is defined in IEEE 802.3u. 100Base-T covers several physical media types, including 100Base-T4 and 100Base-TX using twisted-pair wires. Twisted-pair Ethernet networks typically use RJ-45 modular connectors or variations thereof. Other mediums are known, such as 10Base-F for fiber-optic cable, including fiber passive (FP), fiber link (FL) and fiber backbone (FB). Networks using fiber optic media operate in a similar manner as twisted-pair, but include appropriate fiber-optic cabling, connectors, and physical media interface devices.

Each node in the network is typically a computer of some type, such as a personal computer (PC), minicomputer, mainframe, or the like, where the computer generally includes a network interface card (NIC) for interfacing the computer to a network device, such as a hub, concentrator, repeater, router, bridge, switch, etc., to enable networking capabilities. In the present disclosure, each node or segment is associated with a network device or data terminal equipment (DTE), where each generally refers to any source or destination of data connected to any network system, such as a LAN or the like.

A network operating according to a given communications protocol may be expanded by using one or more repeaters. A repeater is a hardware device that functions at the physical layer of the Open Systems Interconnection (OSI) Reference Model and includes several ports to connect two or more segments of the same network. In particular, a repeater receives packets or data from a data device coupled to one port and re-transmits the packets or data to data devices attached to another port of the repeater. For example, a 10 Mbps repeater in a star configuration with six ports receives a data packet on one of its ports and repeats or re-transmits the message to the remaining five ports. One particular disadvantage of repeaters is a significant amount of extraneous data traffic, since data is repeated to all devices even though usually intended for only one or a subset of the devices.

A bridge is a hardware device which passes packets from one network to another. Bridges operate at the data-link layer of OSI Reference Model and makes several networks appear as a single network to higher level protocols or programs. A bridge serves both as a medium and as a filter, and it allows packets from a node on one network to be sent to a node on another network. At the same time, the bridge discards any packets intended for the originating network rather than passing these to the other network. A switch is a device that connects information coming in with an appropriate outlet. For example, the input may be packets and the outlet might be an Ethernet bus, such as in an Ethernet switch. A switch is similar in function as a multi-port bridge.

The advent of the 100 Mbps standard and a corresponding transition in the industry towards higher transmission rates often results in hybrid systems that service both 10 Mbps and 100 Mbps data devices. One particular product is the 28115 10/100 Ethernet Switch by Bay Networks. The 28115 switch has 16 ports, each capable of operating at either 10 Mbps or 100 Mbps switched. This particular product is relatively expensive since each port is capable of operating at 100 Mbps, where the port is simply throttled back when coupled to a 10 Mbps device. A device which is capable of switch functions at 100 Mbps is very expensive. Also, if several slower speed devices are connected to a single high speed device, such as a server, much of the high speed switch capability is wasted, resulting in an inefficient design.

As networks have evolved with a mix of data devices operating at different communication rates, hardware typically has to be modified and upgraded. It is desired to enable such modifications and upgrades in a cost effective manner.

SUMMARY OF THE INVENTION

An adaptive networking device according to the present invention includes a switch module having several ports and operable at a first data rate, a repeater module also having several ports and operable at a second, greater rate. The adaptive networking device preferably includes several connector ports for coupling to external data devices, such as computers, work stations, file servers, modems, printers, repeaters, switches, routers, hubs, concentrators, etc., for establishing a networking system. Also, the adaptive networking device preferably includes an interface circuit for each connector port for detecting communication from a data device on the corresponding connector port and for coupling that port to either the switch module or the repeater module. Once connected, a port remains in a first communication domain while coupled to the switch module or in a second domain while coupled to the repeater module.

In the embodiments described herein, the first rate is approximately 10 Mbps and the second rate is approximately 100 Mbps. More particularly, the switch module operates according to the Ethernet 10Base-T protocol and the repeater module operates according to the Ethernet 100Base-T protocol. Switch capability for the 10Base-T protocol is significantly less expensive than for 100Base-T. The present invention is applicable to any desired data rate and protocol. For example, the first rate may be 100 Mbps while the second rate is 1 gigabits per second. Also, other protocols are contemplated, such as Token Ring, ARCnet, Copper Distributed Data Interface (CDDI), etc. or any protocols using fiber optic media, such as Fiber Distributed Data Interface (FDDI), 10Base-F and 100Base-FX, etc. The interface circuit preferably senses the speed or data rate of the detected communication and automatically couples the port to the appropriate communication module of the adaptive networking device. The interface circuit may also be configured to sense the communication protocol and couple the port to the compatible communication module.

The switch module operates in switch mode by receiving data at the first rate from any port coupled to it and re-transmitting the received data to only those ports having coupled devices addressed by the data. Preferably, the switch module includes memory for storing data received from any of the ports and a packet circuit for determining if the data is addressed to a data device coupled to another one of the ports. Data is typically transferred in packets incorporating one or more destination addresses, where the packet circuit retrieves the destination address(es) and identifies the destination ports. A data packet is broadcast to all of the other ports only when a broadcast packet is indicated, or if the destination address is unknown. Eventually the destination device sends a source packet and becomes "known" by the switch module. In this manner, data not intended for any other port in the first domain is dropped or otherwise ignored, thereby reducing the amount of collisions in the first domain. The switch module, therefore, enhances the first domain by filtering data rather than repeating the data to every other port coupled to the switch module.

The second domain is shared since data received at any port is repeated to all other ports in the second domain and coupled to the repeater module. In this manner, both domains are effectively isolated from extraneous data from the other domain. This functionality is achieved without the extra cost of switch capability at the higher rate, so that the second, higher speed domain remains shared using a repeater module. For example, the switch module operates at approximately 10 Mbps while the repeater module operates at 100 Mbps, thereby avoiding the cost of a 100 Mbps capable switch device, which is relatively expensive.

In another embodiment according to the present invention, a converter is coupled between the switch module and the repeater module for converting the data rate or protocol to transfer data between the switch and repeater modules. Data received by the switch module from any device in the first domain and intended for one or more devices in the second domain is transmitted to the repeater through the converter. The repeater module re-transmits the data to all ports coupled to it, so that the data reaches the destination device. Data received by the repeater module is transmitted through the converter to the switch module, which determines whether the data should be sent to any of the ports connected to it. Data not intended for any of the devices in the first domain is dropped, thereby reducing extraneous traffic in the first domain.

A method according to the present invention for communicating data between a plurality of data devices coupled to a network device including a switch and a repeater, includes the steps of the switch receiving data from a port coupled to the switch at the first rate, determining a destination port of the received data and transmitting the data at the first rate to the destination ports coupled to the switch, if any. If a converter is provided between the switch and the repeater, the switch determines whether to send the data to the repeater module. If so, the data is converted from the first rate to the second rate and transmitted to the repeater module, which repeats the data to ports coupled to it. Data is sent to the repeater module if not sourced from the repeater module and if the data is addressed to a device coupled to a port coupled to the repeater module or if the destination address is unknown. Finally, the data received by the repeater is converted from the second rate to the first rate and transmitted to the switch at the first rate. The method is adaptable by including the steps of detecting the operable rate of each data device between the first and second rates, coupling each data device operable at a first rate or protocol to the switch, and coupling each data device operable at the second rate or protocol to the repeater.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
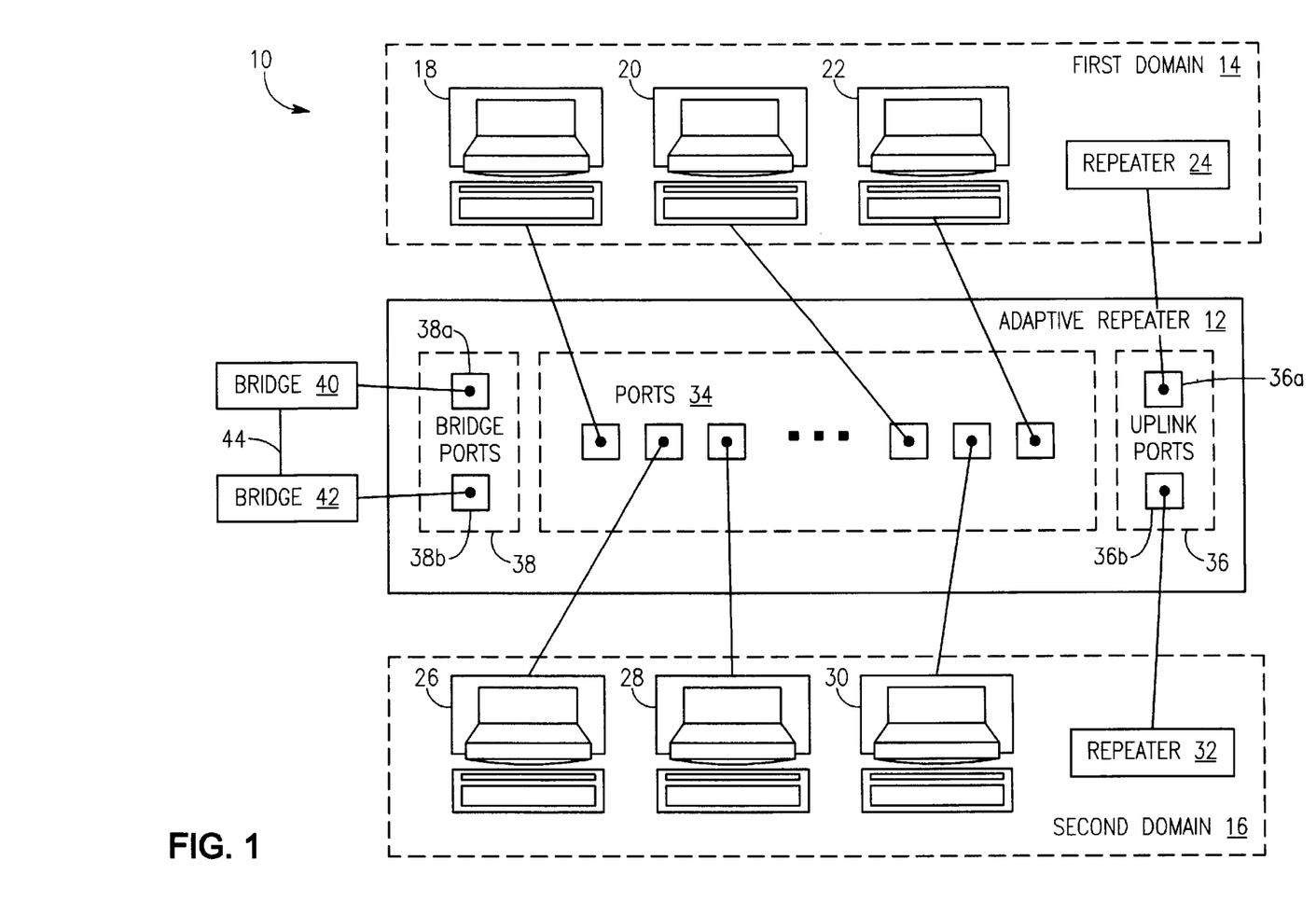
FIG. 1 illustrates a network of data devices.

FIG. 1 illustrates a network 10 for interconnecting a plurality of data devices. Network 10 includes an adaptive repeater 12 servicing data devices in a first domain 14 operating at a first rate and data devices in a second domain 16 operating at a second rate. Network 10 can operate as an Ethernet local area network (LAN) as specified in IEEE (Institute of Electronic and Electrical Engineers) 802.3, a fast Ethernet LAN as specified in IEEE 802.3u, or as any other network for communicating data among data devices coupled to adaptive repeater 12.

First domain 14 includes data devices 18, 20, and 22. Second domain 16 includes data devices 26, 28, and 30. Data devices 18, 20, 22, 26, 28, and 30, represented collectively by exemplary data device 18, include any source or destination of data connected to network 10. Data device 18 is any type of data terminal equipment (DTE) that allows either input or output of data, or is any type of network device for connecting together one or more DTEs. For example, data device 18 can be a computer, work station, file server, modem, printer, or any other device that can receive or transmit data in network 10, such as a repeater, switch, router, hub, concentrator, etc. Data devices 18, 20, and 22 transmit and receive data at a first rate, such as 10 Mbps using traditional Ethernet protocol. Data devices 26, 28, and 30 transmit and receive data at a second rate, such as 100 Mbps using fast Ethernet protocol. Data devices may be coupled to adaptive repeater 12 using unshielded twisted pair (UTP), shielded twisted pair (STP), fiber-optic lines, wireless links, such as infrared or radio frequency links, or any other link that allows communication of data between data devices and adaptive repeater 12.

Repeaters 24 and 32 increase the number of data devices serviced in first domain 14 and second domain 16, respectively. Repeater 24 operates at a first rate and allows additional data devices to be added to domain 14. Repeater 32 operates at second rate and allows additional data devices to be added to second domain 16. Repeaters 24 and 32 may be coupled to adaptive repeater 12 using any of the technologies discussed above for coupling data devices, including a fiber optic inter-repeater link (FOIRL).

Data devices in first domain 14 and second domain 16 couple to ports 34 on adaptive repeater 12. Each port 34 operates at a first rate or a second rate in response to the data rate of the coupled data device. Ports 34 are frequency agile, that is, they automatically negotiate the rate of coupled data devices and select the appropriate frequency to communicate data. Therefore, if a data device modifies its rate, the adaptive repeater 12 automatically places the data device in the proper repeater domain without modifying couplings at ports 34. For example, if the data device 18 is upgraded from 10 Mbps to 100 Mbps, the associated port 34 automatically detects the change in data rate and places data device 18 in second domain 16. In this manner, a network that includes data devices at a first rate and a second rate is easily managed, upgraded, and re-configured without the need to modify couplings at ports 34.

Uplink ports 36 couple repeaters 24 and 32 to first domain 14 and second domain 16, respectively. Uplink ports 36 may be switchable to service only a single data rate or may be frequency agile like ports 34. In the configuration of FIG. 1, uplink port 36a operates at a first rate and couples to adaptive repeater 12 to increase the number of data devices in first domain 14. Furthermore, repeater 24 may include another uplink port to couple to another repeater for further increasing the number of data devices in first domain 14. In a similar fashion, uplink port 36b operates at a second rate and couples to repeater 32 for increasing the number of data devices in second domain 16. Likewise, repeater 32 may include another uplink port to couple to an additional repeater for further increasing the number of data devices in second domain 16. Repeater-to-repeater couplings may be a daisy-chain connection or other appropriate coupling.

Bridge ports 38 couple devices in first domain 14 and devices in second domain 16 to bridge 40 and bridge 42, respectively. Bridge port 38a operates, at least in part, at a first rate and couples devices in first domain 14 to bridge 40. Bridge port 38b operates, at least in part, at a second rate and couples devices in second domain 16 to bridge 42. Bridges 40 and 42 are shown as separate components, but it should be understood that they may be combined into an integral bridge. Bridges 40 and 42 allow data to be communicated between first domain 14 and second domain 16, as represented by link 44.

In operation, adaptive repeater 12 of network 10 services data devices at two or more data rates. For example, data device 18 communicates data to adaptive repeater 12. Adaptive repeater 12 detects that data is being received at a first rate and re-transmits this data to other devices coupled to adaptive repeater 12 that are operating at the first rate. Therefore, adaptive repeater 12 re-transmits the data to data devices 20 and 22, and optionally to repeater 24 and bridge 40. Similarly, data generated at data device 26 at a second rate is re-transmitted by adaptive repeater 12 to data devices 28 and 30, and optionally to repeater 32 and bridge 42. Adaptive repeater 12 automatically detects the data rate at ports 34, and establishes first domain 14 and second domain 16 accordingly.

Data device 18 in first domain 14 communicates data to data device 26 in second domain 16 using bridges 40 and 42. Data device 18 transmits data at a first rate to adaptive repeater 12. Adaptive repeater 12 retransmits the data received from data device 18 to other devices coupled to adaptive repeater 12 operating at the first rate, including bridge 40. Bridge 40 operating, at least in part, at the first rate re-transmits the data to bridge 42 using link 44. In bridge 40 or bridge 42, the data at the first rate is converted into data at a second rate, and bridge 42 re-transmits this data to port 38b of adaptive repeater 12. The data, now at the second rate, is then re-transmitted to the devices coupled to adaptive repeater 12 operating at the second rate, including data device 26.

Figure 2:
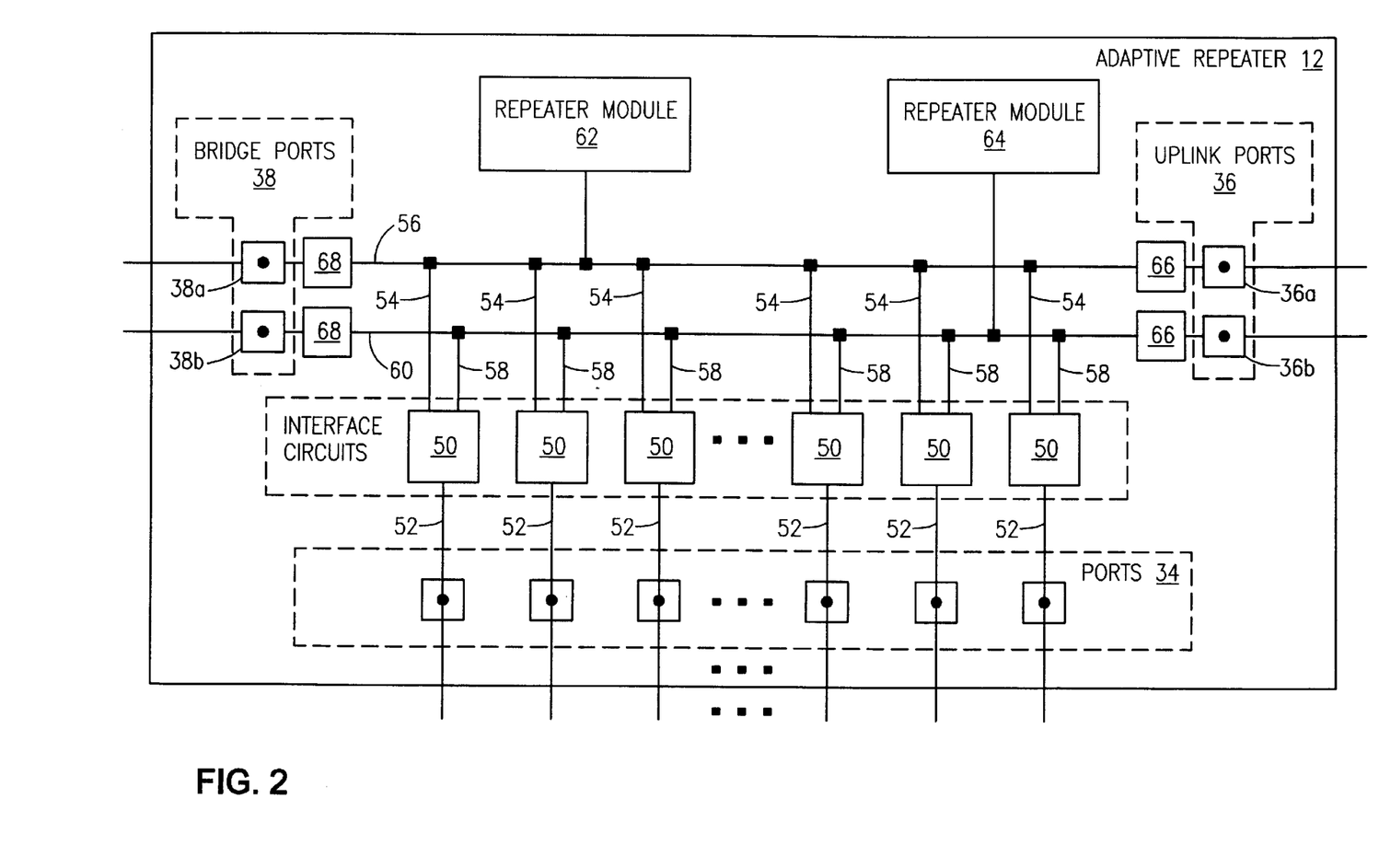
FIG. 2 is a schematic representation of a repeater.

FIG. 2 is a schematic representation of adaptive repeater 12 that includes ports 34, uplink ports 36, and bridge ports 38. Adaptive repeater 12 services data devices and repeaters in both first domain 14 and second domain 16. Adaptive repeater 12 also couples to bridges 40 and 42, which provide communication among first domain 14, second domain 16, and other repeater domains in network 10. Each port 34 couples a data device to an associated interface circuit 50.

Interface circuits 50 couple ports 34 to a first repeater module 62 and a second repeater module 64. Each interface circuit 50 includes a port link 52 coupled to port 34. A first bus link 54 couples interface circuit 50 to a first bus 56 operating at a first rate. Interface circuit 50 also includes a second bus link 58 coupled to a second bus 60 operating at a second rate. First repeater module 62 couples to first bus 56, and second repeater module 64 couples to second bus 60. Each of the first and second repeater modules 62, 64 preferably include a separate and independent port interface for each of the interface circuits 50. First repeater module 62 and second repeater module 64 manage communications to and from interface circuits 50 over first bus 56 and second bus 60, respectively, which also preferably includes separate and independent bus signals for each connection. Interface circuits 50 may be Ethernet transceivers or other physical layer components that can operate at both 10 Mbps and 100 Mbps, depending on the data rate of the associated data device. Examples of such commercially available devices include the RCC611 100BaseTX transceiver manufactured by Raytheon or the DP83840 10/100 Mbps physical layer device manufactured by National Semiconductor.

In operation, interface circuits 50 detect received data at a first rate or a second rate, and communicate data received at the first rate to first repeater module 62 and data received at the second rate to second repeater module 64. After detecting the rate of the received data, interface circuits 50 then select the appropriate data—either data at the first rate on bus 56 or data at the second rate on bus 60—for re-transmission to port 34 and the attached data device. Interface circuits 50 continue to receive and transmit data at the detected rate until a different rate is detected.

First repeater module 62 receives data from a first interface circuit 50 operating at the first rate and re-transmits the data to the remaining interface circuits 50 operating at the first rate. Similarly, second repeater module 64 receives data from a second interface circuit 50 operating at the second rate and re-transmits the data to the remaining interface circuits operating at the second rate.

Uplink interface circuits 66 couple uplink ports 36a and 36b to first bus 56 and second bus 60, respectively. Bridge interface circuits 68 couple bridge ports 38a and 38b to first bus 56 and second bus 60, respectively. In the embodiment of FIG. 2, uplink ports 36 and bridge ports 38 are not switchable. Therefore, uplink port 36a and bridge port 38a communicate with first repeater module 62, and uplink port 36b and bridge port 38b communicate with second repeater module 64.

First bus 56 and second bus 60 are shown as separate components of adaptive repeater 12. However, bus 56 and bus 60 may be integral to first repeater module 62, second repeater module 64, interface circuits 50, uplink interface circuits 66, bridge interface circuits 68, or a combination of these components. The present invention contemplates any structure or operation of first bus 56 and second bus 60 that allows first repeater module 62 and second repeater module 64, respectively, to interconnect with, interface circuits 50, uplink interface circuits 66, and bridge interface circuits 68.

Figure 3:
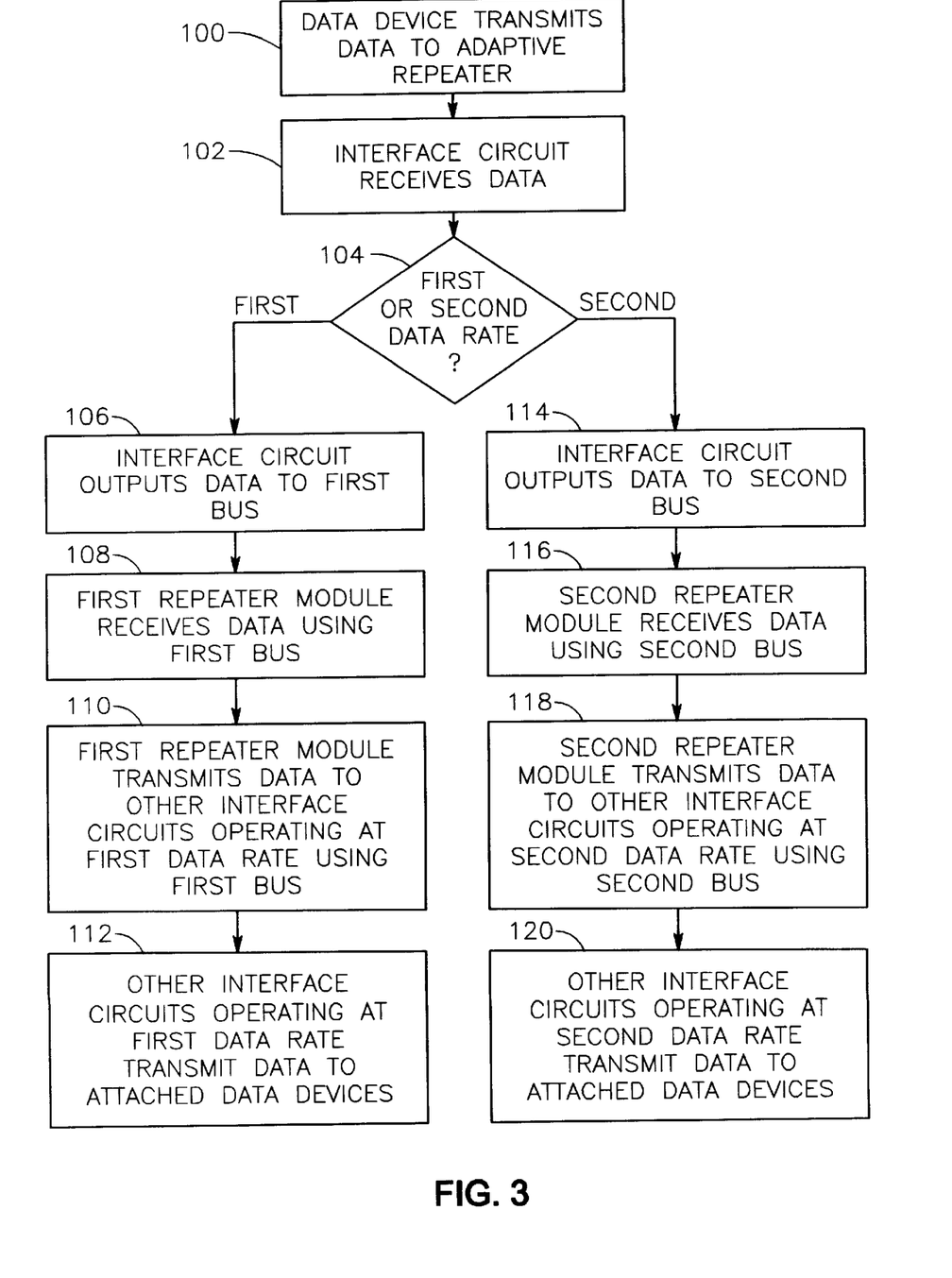
FIG. 3 is a flow chart of a method of communicating data using the repeater of FIG. 2.

FIG. 3 illustrates a flow chart of a method for exchanging data among data devices coupled to adaptive repeater 12 in network 10. A data device 18 transmits data to adaptive repeater 12 (block 100). Interface circuit 50 coupled to port 34 associated with data device 18 receives data on port link 52 (block 102). Interface circuit 50 performs an auto-negotiation or other technique on the received data to determine the data rate (block 104). This may be performed using N-way auto-negotiation developed by International Business Machines Corp., or any other technique to detect the transmission rate from data device 18.

If data is received at a first rate, then interface circuit 50 outputs data to first bus 56 using first bus link 54 (block 106). First repeater module 62 receives the data using first bus 56 (block 108). First repeater module 62 then transmits data using first bus 56 and first bus links 54 to other interface circuits 50 operating at the first rate (block 110). The other interface circuits 50 operating at the first rate transmit the data using port links 52 to associated data devices attached to ports 34 (block 112).

If interface circuit 50 determines that the data received at port link 52 is at a second rate (block 104), then interface circuit 50 outputs the data on second bus link 58 coupled to second bus 60 (block 114). Second repeater module 64 receives the data using second bus 60 (block 116). Second repeater module 64 then transmits the data using second bus 60 and second bus links 58 to other interface circuits 50 operating at the second rate (block 118). The other interface circuits 50 operating at the second rate transmit the data using port links 52 to associated data devices attached to ports 34 (block 120).

First repeater module 62 and second repeater module 64 may also communicate with associated uplink interface circuits 66. Uplink interface circuits 66 communicate with repeaters 24 and 32 to increase the number of data devices in first domain 14 and second domain 16, respectively. First repeater module 62 and second repeater module 64 may also communicate with bridge interface circuits 68. Bridge interface circuits 68 communicate with bridges 40 and 42 using bridge ports 38.

Figure 4:
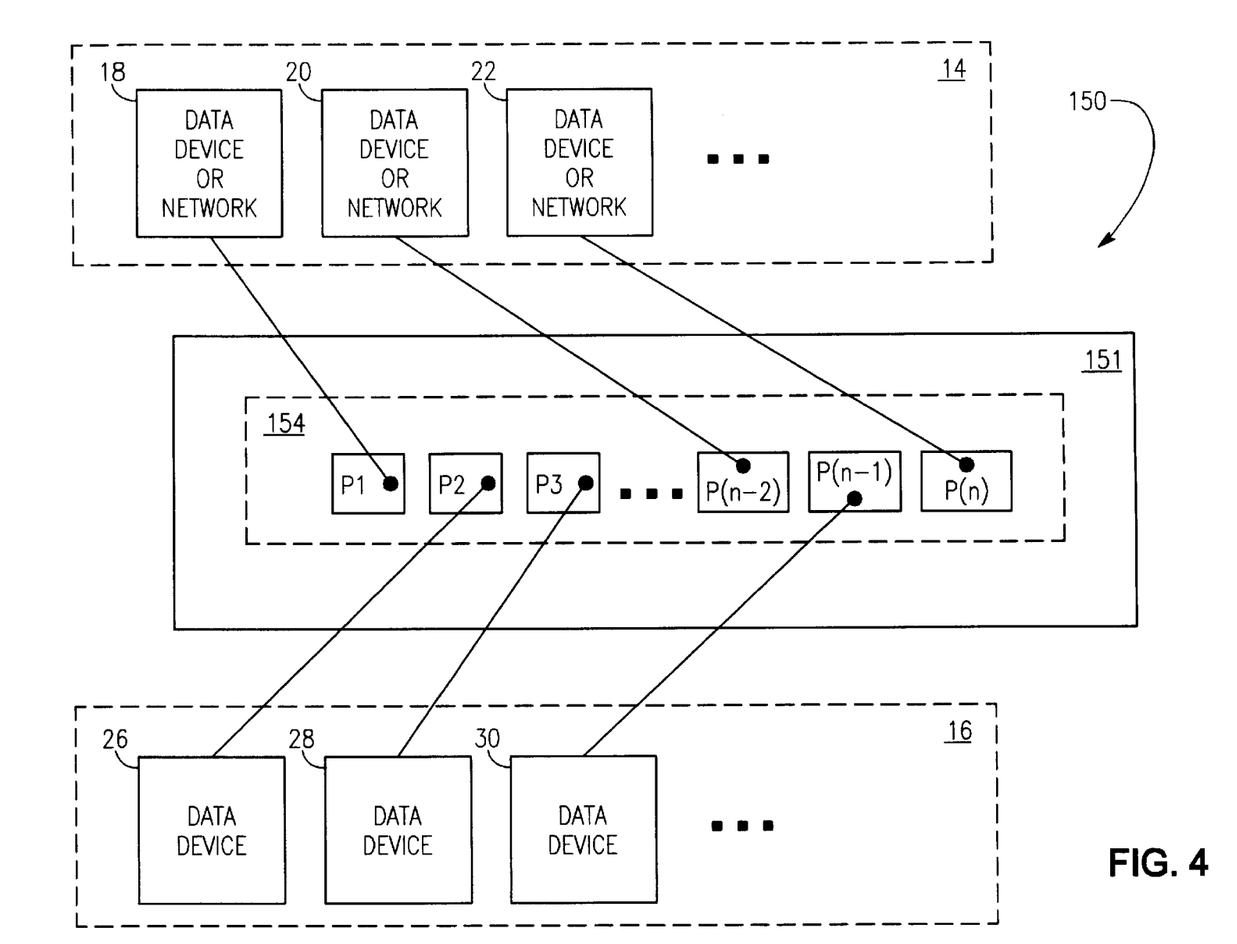
FIG. 4 is a block diagram illustrating a network including an adaptive networking device according to the present invention.

Referring now to FIG. 4, a block diagram is shown illustrating a network 150 including an adaptive networking device 151 according to the present invention. The adaptive networking device 151 operates in a similar manner as the adaptive repeater 12 for servicing data devices 18, 20, 22, etc. in the first domain 14 and data devices 26, 28, 30, etc. in a second domain 16. Similar devices assume identical reference numerals. However, the "data devices" 18, 20, 22 or other devices of the first domain 14 alternatively represent networks for coupling more than one data device to a segment, where the segment is coupled to one of several ports 154 of the adaptive networking device 151. For purposes of simplicity, the data devices 26, 28, 30 and other devices in the second domain 16 are also coupled to one of the ports 154 through an appropriate cable segment. Further, the first domain 14 operates according to a first protocol and the second domain operates according to a second protocol. In some embodiments described herein, the first and second protocols operate at first and second data rates, respectively. However, the present invention is not limited to protocols differing only by data rate, so that the protocols may differ by more than data rate.

In a similar manner as described above for the adaptive repeater 12, the connector ports 154 are frequency agile, where each port 154 automatically negotiates the protocol of a coupled segment and selects the appropriate protocol to communicate data. For example, the port 154 negotiates the data rate and selects an appropriate frequency of operation. There are n ports, where n is an integer number such as 8, 10, 16, 24, 32, etc., or any other convenient number of ports for a networking device. For purposes of simplicity and clarity, the first domain 14 preferably operates at 10 Mbps while the second domain 16 operates at 100 Mbps. More preferably, the first domain 14 operates according to the Ethernet 10Base-T protocol and the second domain 16 operates according to the Ethernet 100Base-T protocol. It is noted however, that the present invention is not limited to any particular communication rates or network protocols. For example, the first domain 14 could operate at 100 Mbps and the second domain 16 at 1 gigabits per second (Gbps), and vice versa. Although not shown in FIG. 4, the adaptive networking device 151 may optionally include the uplink ports 36a and 36b and the bridge ports 38a and 38b, if desired. Also, the domains 14 and 16 may optionally include other network devices, such as repeaters 24 and 32, respectively, if desired.

The adaptive networking device 151 operates the first domain 14 in a switch mode rather than in a repeater mode as described above for the adaptive repeater 12. In this manner, the adaptive networking device 151 examines source and destination media access control (MAC) addresses of each data packet received from data devices or networks 18, 20, 22, etc. in the first domain 14 and re-transmits the data packet to one or more of the other ports of the adaptive networking device 151. If a destination address is unknown, the data packet is broadcast to the remaining ports, if any, associated with the first domain 14. Eventually, the switch function "learns" the port associated with each destination address and sends the packet to the appropriate port. For example, data packets from the network 18 transmitted to the adaptive networking device 151 and intended for a data device in network 20 are re-transmitted by the adaptive networking device 151 to port P(n-2) and thus to the network 20 only. In contrast to the operation of the adaptive repeater 12, these data packets intended for the network 20 are not transmitted to any other port of the adaptive networking device 151. Multi-cast or broadcast packets intended for several data devices in the first domain 14 are sent only to ports coupled to the addressed data devices rather than to all other ports associated with the first domain 14.

In this manner, the adaptive networking device 151 substantially enhances the performance of the first domain 14. Operation in switched mode rather than "shared" mode, as described above for the adaptive repeater 12, reduces the amount of data transmitted to each of the ports associated with the first domain 14 by not repeating each data packet to every other port as is the case for a repeater. This results in a reduced amount of collisions during operation, which increases the effective rate of data transfer.

The adaptive networking device 151 operates the second domain 16 in shared mode in the same manner as the adaptive repeater 12. Thus, the adaptive networking device 151 re-transmits data sourced from any of the data devices 26, 28, 30, etc. connect to one port 154 to all other ports associated with the second domain 16. Several specific embodiments the adaptive networking device 151 are described below. In one embodiment described herein, the switch domain 14 and the repeater domain 16 are independent, though the domains 14, 16 may be coupled externally for data transfer there-between. In another embodiment described herein, the domains 14 and 16 are internally coupled for enabling data transfer between the first domain 14 and the second domain 16.

Figure 5:
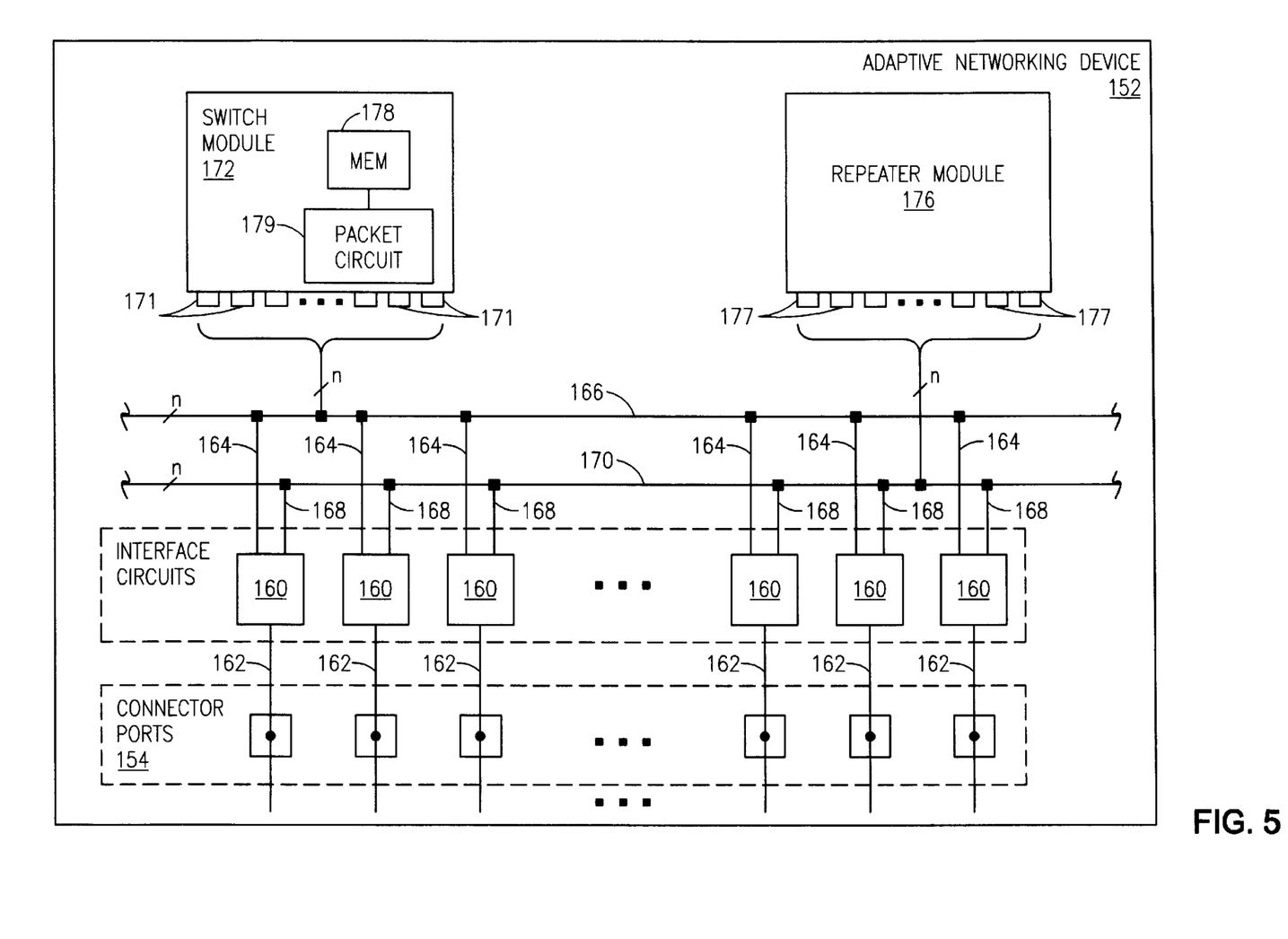
FIG. 5 is a more specific schematic representation of one embodiment of the adaptive networking device of FIG. 4.

Referring now to FIG. 5, a schematic diagram is shown of an adaptive networking device 152, which is implemented according to one embodiment of the adaptive networking device 151 of FIG. 4. Similar devices assume identical reference numerals. Interface circuits 160 couple a corresponding one of the connector ports 154 to either a switch module 172 or a repeater module 176. Preferably, there are n interface circuits 160, one for each of the connector ports 154, where each interface circuit 160 includes a port link 162 coupled to a respective one of the connector ports 154. A first bus link 164 couples interface circuit 160 to a first bus 166 operating according to a first protocol. Interface circuit 160 also includes a second bus link 168 coupled to a second bus 170 operating according to a second protocol. The switch module 172 couples to the first bus 166, and the repeater module 176 couples to second bus 170. The switch module 172 preferably includes n separate and independent port interfaces 171, one for each of the interface circuits 160, and the repeater module 176 also preferably includes n port interfaces 177, one for each of the interface circuits 160. The switch module 172 and the repeater module 176 manage communications to and from interface circuits 160 over the first bus 166 and second bus 170, respectively, where the buses 166, 170 also preferably include n separate and independent bus signals for each connection.

The interface circuits 160 are similar in design and operation as the interface circuits 50. For example, in one embodiment, the interface circuits 160 include Ethernet transceivers or other physical layer components that operate at both protocols, such as 10 Mbps and 100 Mbps, depending on the protocol of the associated data device or network segment. The interface circuits 160 may alternatively include a separate Ethernet transceiver for each protocol, such as, for example, a 10Base-T compatible transceiver for coupling to the switch module 172 and a 100Base-T compatible transceiver for coupling to the repeater module 176.

The switch module 172 preferably includes a memory 178 and a packet circuit 179 coupled to the memory 178 for performing switch and filtering functions. The memory 178 implements registers or buffers or the like for receiving and temporarily storing data packets received from the data devices or networks 18, 20, 22, etc., in the domain 14, and for storing MAC addresses for comparison. The packet circuit 179 examines the MAC addresses included within each data packet for identifying the appropriate destination port or ports for sending or each packet. The packet circuit 179 also filters the data packets by dropping packets sent between two devices of a network coupled to the same port.

The adaptive networking device 152 provides substantial improvement over the adaptive networking device 12 without a significant increase in cost. Data devices operating according to either the first domain 14 or the second domain 16 are coupled to the appropriate module 172 or 176, respectively, as described previously. Furthermore, devices in the first domain 14 operate in switch mode thereby significantly reducing extraneous traffic for the first domain 14. An external connection between the first and second domains, such as with a bridge device or the like, provides substantial operation improvement since the first domain 14 is not bogged down with extraneous traffic from the second domain 16.

Figure 6:
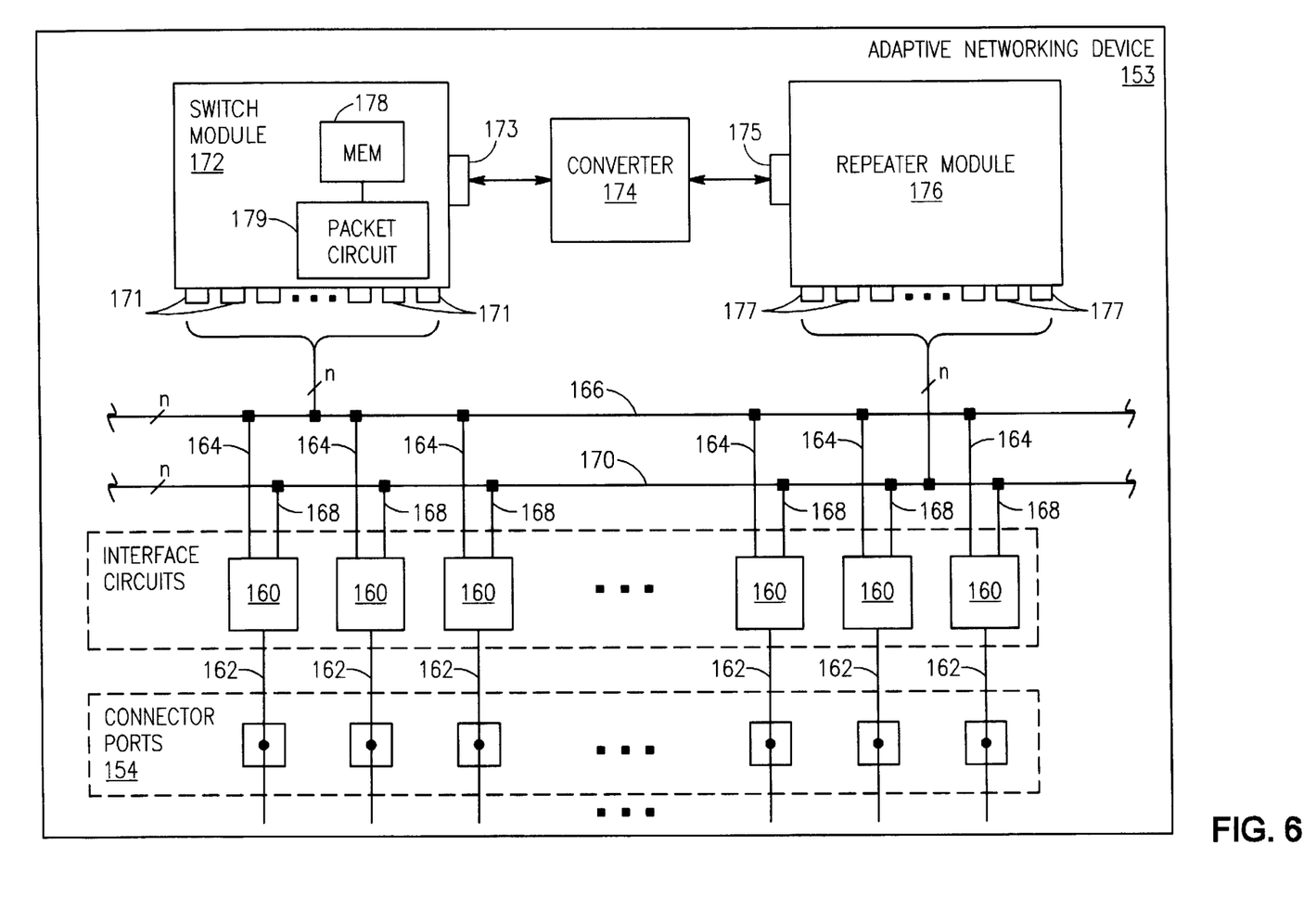
FIG. 6 is a more specific schematic representation of another embodiment of the adaptive networking device of FIG. 4.

Referring now to FIG. 6, a schematic diagram is shown of an adaptive networking device 153, which is implemented according to another embodiment of the adaptive networking device 151 of FIG. 4. Similar devices assume identical reference numerals. The adaptive networking device 153 is similar to the adaptive networking device 152, except that an internal connection is provided between the switch module 172 and the repeater module 176. In particular, the switch module 172 includes an additional port interface 173 for coupling to one port of a converter module 174. The converter module 174 includes another port for coupling to an additional port interface 175 of the repeater module 176. The converter module 174 converts between the first and second protocols. In one embodiment, the converter module 174 is a bidirectional, 10/100 converter for converting the rate of data between the switch module 172 operating at a first data rate and the repeater module 176 operating at a second data rate.

In operation, data sent from any data devices in the first domain 14 intended for one or more data devices in the second domain 16 is transmitted according to the first protocol to the converter module 174, which converts the protocol and re-transmits the data to the repeater module 176 according to the second protocol. For example, if the first protocol operates at a first rate of 10 Mbps and the second protocol operates at a second rate of 100 Mbps, then the converter module 174 converts between the first and second data rates. The repeater module 176 re-transmits received data to all of the ports 154 associated with or otherwise coupled to the second domain 16. The repeater module 176 also transmits data communicated from any of the data devices in the second domain 16 to the converter module 174 through the port interface 175, which data is converted to the first protocol and is re-transmitted to the switch module 172. However, the switch module 172 filters the data, where data is transmitted only to the appropriate ports 154 to which addressed devices are coupled. Otherwise, the data packet is dropped or ignored by the switch module 172. This filtering function serves to reduce the amount of traffic on the first domain 14, especially by eliminating extraneous traffic from the second domain 16.

Again, the switch module 172 preferably includes memory 178 and a packet circuit 179 coupled to the memory 178 for performing switch and filtering functions. The switch module 172 thus re-transmits each data packet only to the appropriate port if known. Although the repeater module 176 transmits all of its received data packets to the switch module 172, the switch module 172 filters the packets and drops all packets not intended for any devices in the first domain 14. Also, the switch module 172 re-transmits packets from the repeater module 176 only to the port 154 to which an addressed device is coupled.

The filtering function of the switch module 172 effectively isolates both of the domains 14 and 16 from extraneous traffic from the other domain. It is noted that the switch module 172 initially may operate in a similar manner as a repeater module during early stages of operation while a substantial number of new MAC addresses are being learned. However, the operation of the switch module 172 stabilizes after learning most or all addresses, so that efficiency is substantially increased.

Figure 7:
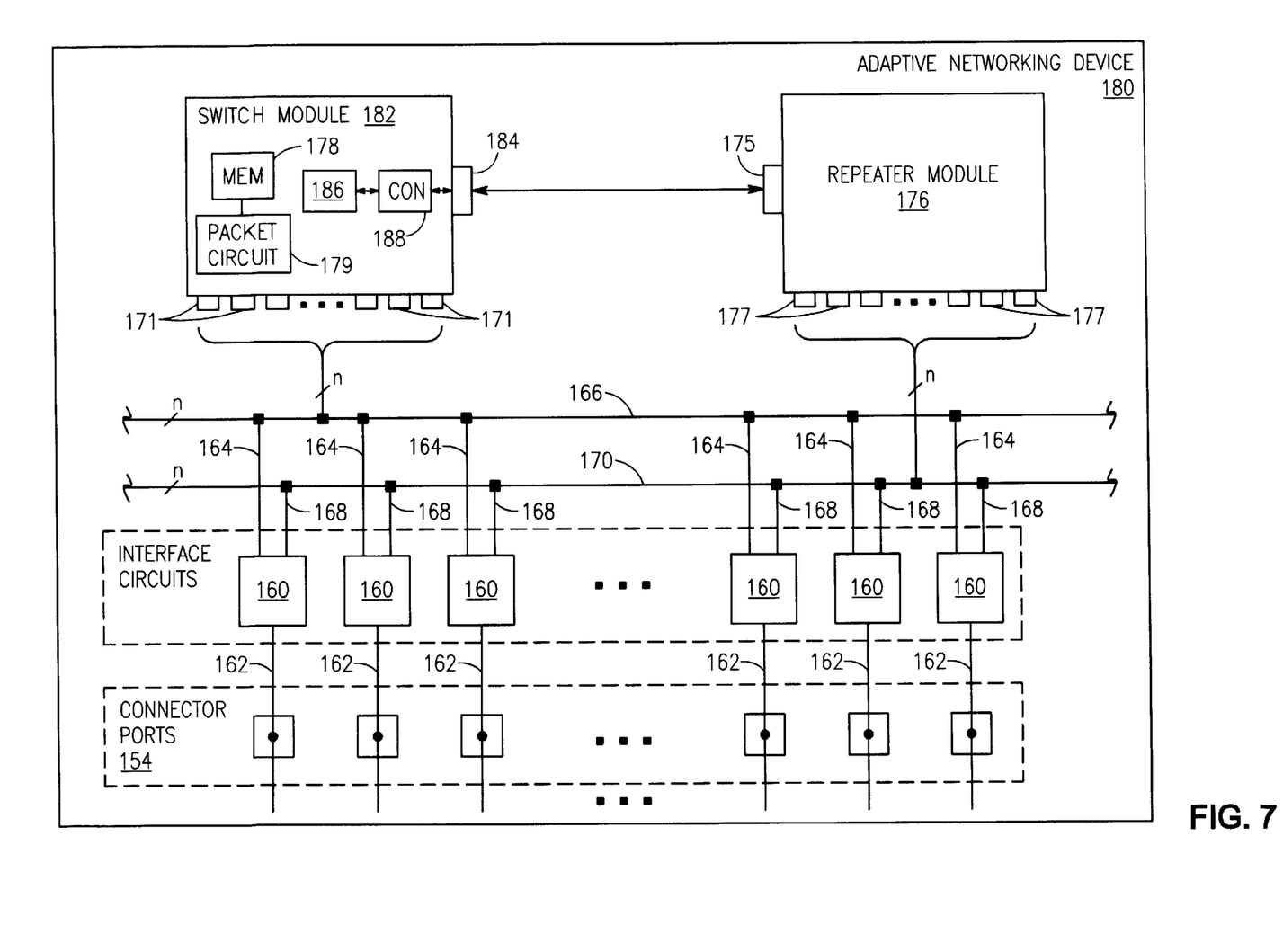
FIG. 7 is a schematic representation of an alternative embodiment of the adaptive networking device of FIG. 6.

FIG. 7 is a schematic representation of an alternative adaptive networking device 180, which operates in a similar manner as the adaptive networking device 153, except that the converter functions are incorporated into the switch module 172. Similar devices assume identical reference numerals. The switch module 172 is replaced with a switch module 182 having a port 184 operating at the second rate, which couples directly to the port interface 175 of the repeater module 176. Internally, the switch module 182 includes a port 186 operating according to the first protocol, which is coupled to the port 184 through a bidirectional converter 188. Thus, the switch functions are performed at the first protocol and then the data is converted to the second protocol for transmission to the repeater module 176. Data transmitted from the repeater module 176 to the switch module 182 is converted by the converter 188 to the first protocol, and then filtered by the switch module 182. The switch module 182 preferably includes the memory 178 and the packet circuit 179, and the functionality of the adaptive networking devices 152 and 180 are similar.

In a similar manner as described previously, in one embodiment the first and second protocols operate at first and second rates, respectively, where the first and second rates are preferably 10 Mbps and 100 Mbps, respectively. Thus, the ports 184, 186 and the converter 188 effectively operate as a 10/100 port.

Figure 8:
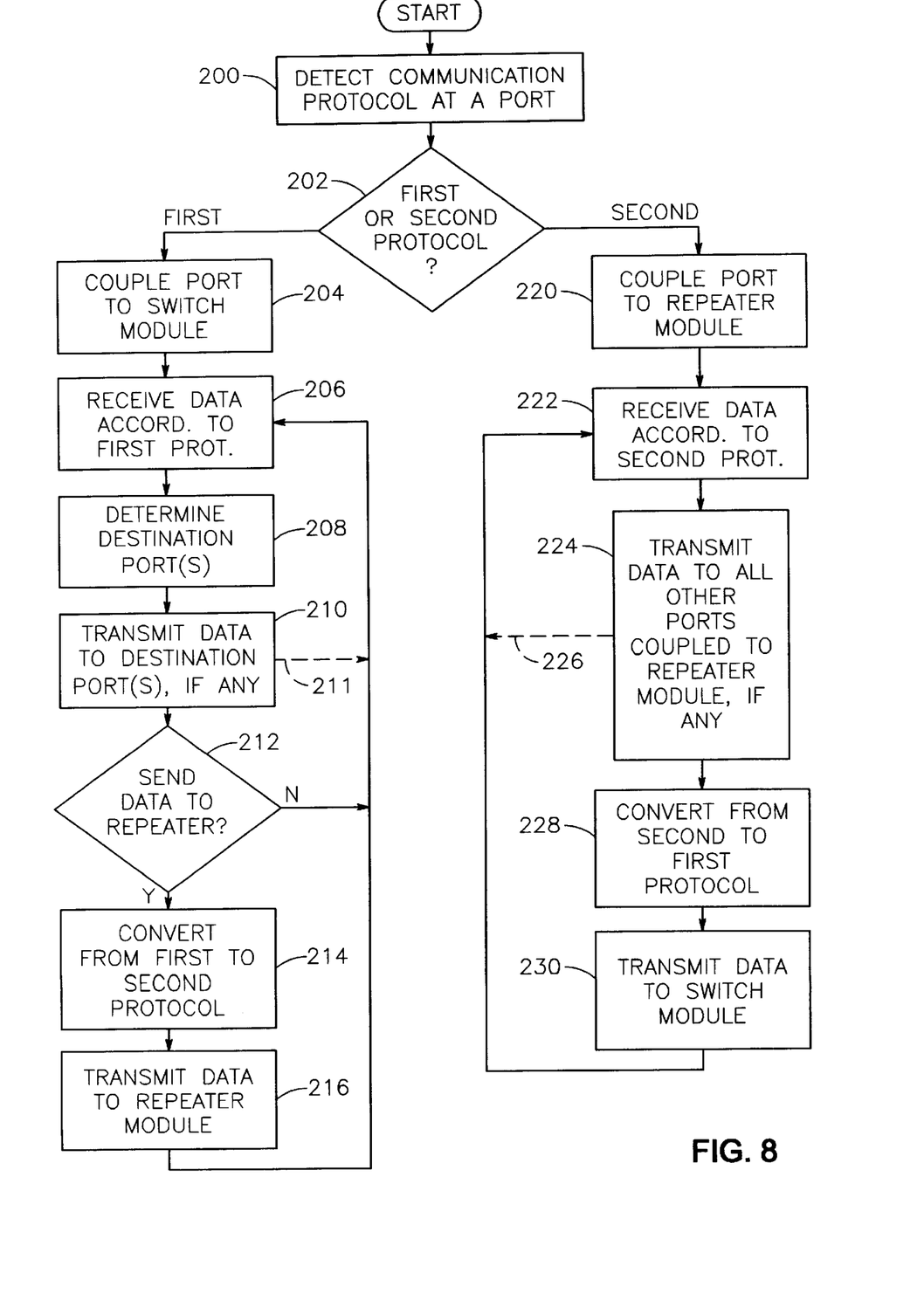
FIG. 8 is a flowchart diagram illustrating operation of an adaptive networking device according to the present invention.

FIG. 8 is a flowchart diagram illustrating operation of the adaptive networking device 151, which includes the embodiments of the adaptive networking devices 152, 153 and 180. A data device or network segment is coupled to one of the connection ports 154 and the corresponding interface circuit 160 detects the rate of communication in step 200. As indicated in next step 202, the interface circuit 160 couples the port to the switch module 172 (or 182) in step 204 if the detected protocol is the first protocol, or to the repeater module 176 in step 220 if the detected protocol is the second protocol. If the port is coupled to the switch module, the switch module receives data according to the first protocol in step 206 after step 204 and determines the destination port or ports in next step 208. There may be more than one destination address and thus more than one destination port. Furthermore, all other ports (other than the source port) are considered destination ports if the destination address is unknown. The data is then transmitted to the destination port(s) of the switch module, if any, in next step 210. For the adaptive networking device 152 without an internal connection between the switch and repeater modules, operation is completed for the current data packet, and operation returns to step 206 for a next data packet received from the same port as indicated by a dashed line 211.

For the adaptive networking devices 153 or 180, a next decision step 212 determines whether the data should be sent to the repeater module 176. Data is sent to the repeater module 176 if not received from the repeater module 176 and if the destination address indicates a device in the second domain 16. Also, data is sent to the repeater module 176 if not received from the repeater module 176 and if the destination address is unknown. If data is not to be re-transmitted to the repeater module 176, operation returns to step 206 for the next data packet received at the same port of the switch module. If the data packet is to be transmitted to the repeater module 176, operation proceeds to next step 214, where the data rate is converted to the second protocol. Then in step 216, the data is transmitted to the repeater module 176. Operation returns to step 206 for the next data packet received at that same port of the switch module.

Referring back to step 220, the data from the port coupled the repeater module 176 is received according to the second protocol in next step 222, and then transmitted to all other ports coupled to the repeater module, if any, in next step 224. For the adaptive networking device 152 without the internal connection, operation is completed for the current data packet and operation returns to step 222 for the next packet for that port as indicated by a dashed line 226. For the adaptive networking devices 152 or 180, operation proceeds to next step 228, where the data is converted from the second protocol to the first protocol. Operation proceeds to step 230, where the data is transmitted to the switch module. Operation then proceeds to step 222 for the next packet received at the same port.

The entire procedure described above is completed for each port coupled to a new network segment.

Figure 9:
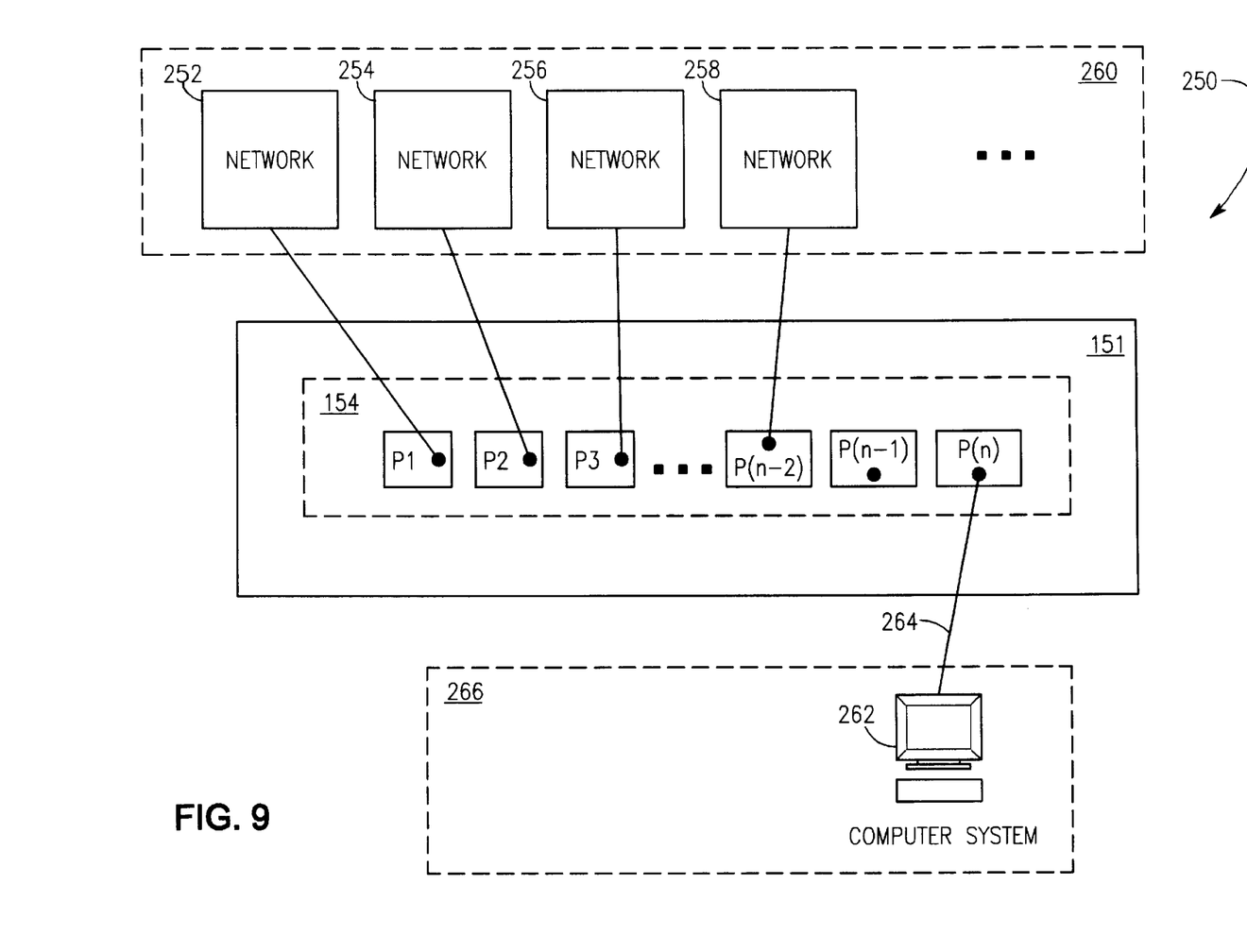
FIG. 9 is a block diagram illustrating another network using an adaptive networking device according to the present invention.

Referring now to FIG. 9, a block diagram is shown illustrating another network 250 using the adaptive networking device 151, where one of the adaptive networking devices 153 or 180 may be used. Similar devices assume identical reference numerals. The adaptive networking device 152 could be used with an external connection between the switch and repeater modules. Several networks 252, 254, 256, 258, etc. (252–258) operating according to a first protocol, which is preferably at a rate of 10 Mbps, in a first domain 260 are coupled to the adaptive networking device 151 through respective connector ports 154. Each of the networks 252–258 includes one or more of any type of DTE or network device, such as computer, work station, file server, modem, printer, repeater, switch, router, hub, concentrator, etc., coupled to a network segment, which is coupled to a port 154. The adaptive networking device 151 detects the protocol of each of the networks 252–258 and connects them to the switch module 172 for switch mode operation. A computer system 262 in a second domain 264 operating according to a second protocol, which is preferably at a data rate of 100 Mbps, is coupled to one of the connector ports 154 through a higher speed interface 264. The computer system 262 preferably includes a network interface card (NIC) or the like plugged into one of its input/output (I/O) slots for enabling communication at the high rate. Data sent from any one of the networks 252–258 to the computer system 262 is transmitted through the switch module 172, the converter module 174 and the repeater module 176. The computer system 262 preferably operates as a server system for servicing the networks 252–258.

It is appreciated that the adaptive networking device 151 enhances the performance for the networks 252–258 in the domain 260 due to switch mode operation. Furthermore, all of the data devices in the networks 252–258 effectively share the computer system 262 through a relatively high speed interface, which is approximately ten times the speed of the individual data devices in the embodiment shown. Thus, the communications of the networks 252–258 generally aggregate into the interface 264 and the computer system 262. Since the interface 264 and the computer system 262 operate at a significantly higher speed, it appears to each of the networks 252–258 that they have a direct connection to the computer system 262.

Figure 10:
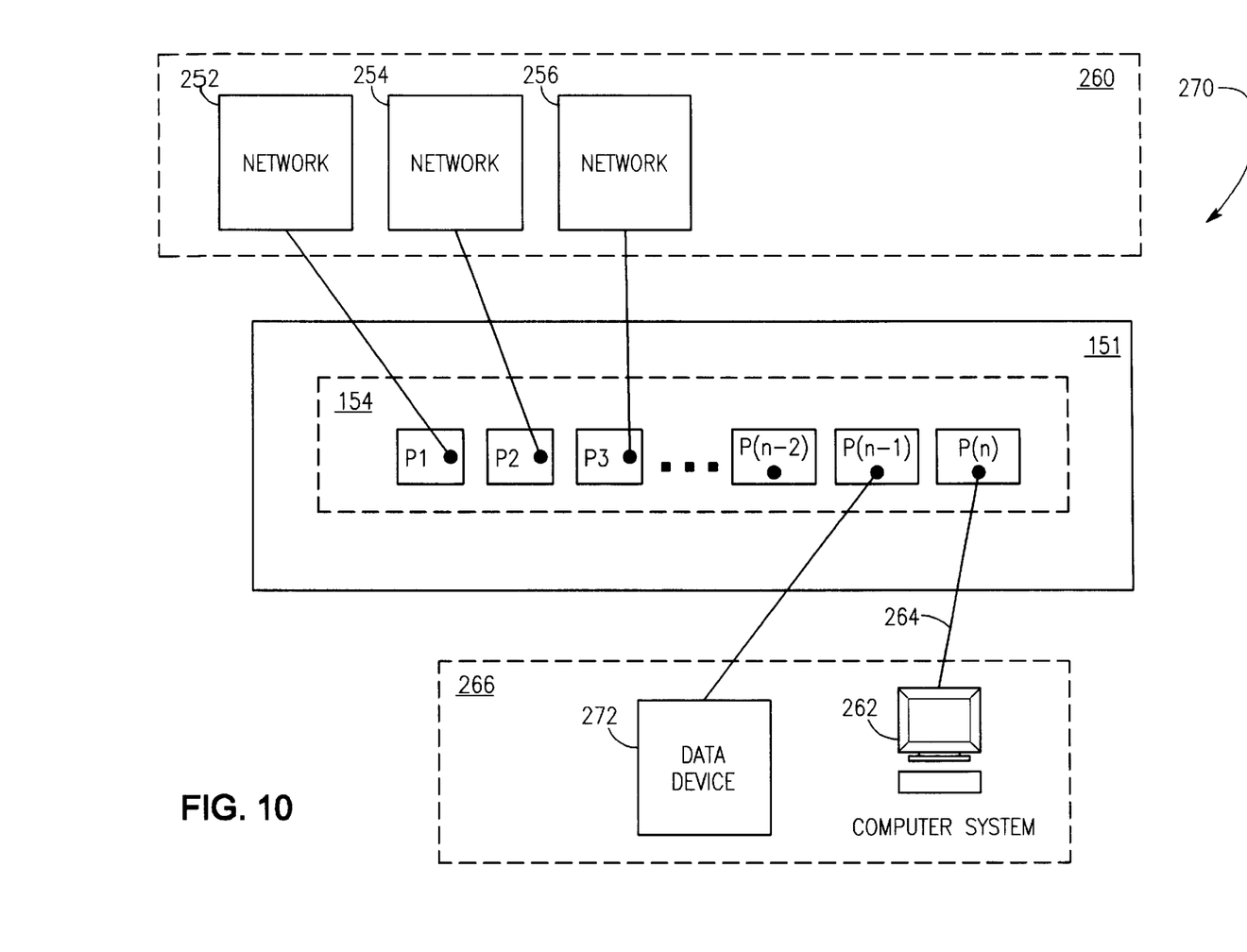
FIG. 10 is a block diagram illustrating the adaptability of an adaptive networking device according to the present invention.

FIG. 10 shows another network 270 illustrating the adaptability of an adaptive networking device according to the present invention. The network 270 is similar to the network 250, where similar components assume identical reference numerals, except that the network 258 in the domain 260 is replaced with a higher speed data device 272, preferably operating at a second data rate. The adaptive networking device 151 detects the protocol of the data device 272 and places it in the second domain 266. Thus, the data device 272 and the computer system 262 are in the shared domain 266, while the networks 252–256 remain in the switched domain 260.

It is now appreciated that an adaptive networking system according to the present invention enhances performance of a network without substantially increasing cost. In one embodiment, a converter enables data transfer between the two domains operating with different protocols. In another embodiment, a slower domain is switched using a switch device while a faster domain is shared, so that high speed switch capability is not required. The devices operating in a slower, switched domain are not bogged down by extraneous data traffic and have greater access to the higher speed devices. Also, since the slower domain is switched, the higher speed domain does not overrun the buffers causing dropped packets in the slower domain. Data not intended for the slower domain is filtered by the switch device. Thus, the two domains are effectively isolated from extraneous traffic of the other.

An adaptive networking system is particularly advantageous if a single, high speed server is connected since most of the traffic occurs between the slower, switched devices and the server. Each port is preferably frequency agile, which senses the speed of a connected data device and couples it to the appropriate domain. The adaptive networking device is therefore easily adaptable by simply replacing a data device operable at a first protocol or rate with a data device operating at a second protocol or rate.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. An adaptive network device including a plurality of ports to enable communication among a plurality of devices, comprising:

a network switch device that operates in a first communication domain according to a first communication protocol;

a network repeater device that operates in a second communication domain according to a second communication protocol;

a plurality of adaptive ports, each capable of detecting communication according to the first and second communication protocols and coupling to either one of the network switch device and the network repeater device; and each of the plurality of adaptive ports, if detecting communication according to the first communication protocol, coupling to the network switch device to operate in the first communication domain, and, if detecting communication according to the second communication protocol, coupling to the network repeater device to operate in the second communication domain.

2. The adaptive network device of claim 1 wherein the first communication protocol operates at a slower data rate than the second communication protocol.

3. The adaptive network device of claim 2 wherein the first and second communication protocols operate according to Ethernet.

4. The adaptive network device of claim 1 wherein each of the plurality of adaptive ports further comprises:

an external port connector; and an interface circuit, coupled to the port connector, the network switch device and the network repeater device, the interface circuit detecting and distinguishing between the first and second communication protocols.

5. The adaptive network device of claim 1, further comprising:

a converter, coupled to the network switch device and that network repeater device, that converts communication between the first and second communication protocols.

6. The adaptive network device of claim 5, further comprising:

the first and second communication protocols using packets for communication in which each packet includes source and destination device identifiers; and the network switch device learning device identifiers of each packet from the first and second communication domains and filtering packets accordingly.

7. The adaptive network device of claim 6 wherein the first communication protocol operates at a slower data rate than the second communication protocol.

8. An adaptive networking system, comprising:

a plurality of data devices, each operable to communicate data at one of a first rate and a second rate; and an adaptive networking device for enabling communication among the plurality of data devices, comprising:

a switch module operable at the first rate;

a repeater module operable at the second rate; and a plurality of adaptive ports, each for coupling to any of the plurality of data devices, each of the plurality of adaptive ports capable of detecting a data rate of a coupled data device and connecting to one of the switch and repeater modules based on detected data rate.

9. The networking system of claim 8 wherein each of the plurality of adaptive ports of the adaptive networking device further comprises:

a port connector for receiving and coupling at least one data device; and an interface circuit, coupled to the port connector, that is operable to detect a data rate of the at least one data device and to establish communication between the at least one data device and a selected one of the switch module and the repeater module.

10. The networking system of claim 9 wherein each interface circuit is operable to couple a corresponding one of the plurality of adaptive ports to the switch module if a data device coupled to the corresponding port is operable at the first rate and to couple the corresponding port to the repeater module if the data device is operable at the second rate.

11. The networking system of claim 8, further comprising:

a converter, coupled to the switch module and to the repeater module, that converts between the first and second rates to transfer data between the switch module and the repeater module.

12. The networking system of claim 11, wherein the switch module is operable to receive data from a source including the converter and any of the plurality of adaptive ports operating at the first rate, to examine the data to determine a destination selected from the converter and the plurality of adaptive ports operable at the first rate, to drop the data if the destination is the same as the source, and to communicate the data to the destination if not the same as the source.

13. The networking system of claim 11, wherein the repeater module is operable to receive data from any one of the converter and the plurality of adaptive ports operating at the second rate, and to communicate the data to every other one of the converter and the plurality of adaptive ports operating at the second rate.

14. The networking system of claim 8, wherein the second rate is greater than the first rate.

15. The adaptive networking device of claim 14, wherein the switch and repeater modules operate according to Ethernet.

16. A method for communicating data between a plurality of data devices using a network device including a switch, a repeater and a plurality of adaptive ports, comprising steps of:

detecting one of at least two different communication protocols of a data device coupled to any one of the plurality of adaptive ports;

coupling the any one of the plurality of adaptive ports to either one of the switch and the repeater based on the detected one of the at least two different communication protocols;

operating any data devices coupled to the switch in a first domain according to a first communication protocol; and operating any data devices coupled to the repeater in a second domain according to a second communication protocol.

17. The method of claim 16, further comprising steps of:

operating the first domain according to the first communication protocol at a first data rate; and operating the second domain according to the second communication protocol at a second data rate that is greater than the first data rate.

18. The method of claim 17, wherein the detecting step comprises detecting the operable rate of a data device coupled to any one of the plurality of ports between the first and second rates.

19. The method of claim 17, further comprising steps of:

converting first data received at the repeater from the second data rate to the first data rate and transmitting the converted first data to the switch; and converting second data received at the switch from the first data rate to the second data rate and transmitting the converted second data to the repeater.

20. The method of claim 19, further comprising a step of:

converting the second data received at the switch from the first data rate to the second data rate and transmitting the converted second data to the repeater if a destination of the second data is unknown or if the second data is intended for a data device in the second domain.

* * * * *